United States Patent [19]
Harrell et al.

[11] 3,928,012
[45] *Dec. 23, 1975

[54] METHOD AND APPARATUS FOR REGULATING THE TEMPERATURE OF A GLASS SHEET FLOAT TANK

[75] Inventors: William C. Harrell, Sarver; Homer R. Foster, Kittanning, both of Pa.

[73] Assignee: PPG Industries, Inc., Pittsburgh, Pa.

[ * ] Notice: The portion of the term of this patent subsequent to Oct. 22, 1991, has been disclaimed.

[22] Filed: Oct. 21, 1974

[21] Appl. No.: 516,693

Related U.S. Application Data

[63] Continuation-in-part of Ser. No. 338,496, March 6, 1973, Pat. No. 3,843,345.

[52] U.S. Cl. ............... 65/65 A; 65/99 A; 65/182 R
[51] Int. Cl.² .................................... C03B 18/02
[58] Field of Search ............. 65/182 R, 65 A, 99 A

[56] References Cited
UNITED STATES PATENTS

| | | |
|---|---|---|
| 3,432,284 | 3/1969 | Gulotta ........................... 65/182 R |
| 3,503,728 | 3/1970 | Itakura ............................ 65/182 R |
| 3,539,320 | 11/1970 | Plumat et al. ................. 65/182 R X |
| 3,843,345 | 10/1974 | Harrell et al. ...................... 65/65 A |

Primary Examiner—Arthur D. Kellogg
Attorney, Agent, or Firm—E. Kears Pollock

[57] ABSTRACT

Flat glass having superior optical quality and having surfaces substantially free of defects is continuously produced in a short forming chamber by delivering molten glass onto a pool of molten metal and advancing this glass along the surface of the pool of molten metal while cooling it to form a dimensionally stable sheet or ribbon of glass which is removed from the pool. A portion of the molten metal is separated and removed from the pool of molten metal in the vicinity of molten glass delivery onto the molten metal. This removed metal is cooled and reintroduced into the pool of molten metal in the vicinity of removal of the sheet of glass from the pool of molten metal.

20 Claims, 7 Drawing Figures

METHOD AND APPARATUS FOR REGULATING THE TEMPERATURE OF A GLASS SHEET FLOAT TANK

CROSS REFERENCE TO RELATED APPLICATIONS

This application if a continuation-in-part of application Ser. No. 338,496 filed Mar. 6, 1973 by the present applicants. The disclosure of that application is fully and specifically incorporated by reference herein. That application issued as as U.S. Pat. No. 3,843,345 on Oct. 22, 1974, entitled "Delivery of Molten Glass to a Float Forming Process". This application is also related to application Ser. No. 483,508 filed June 27, 1974 by Gerald E. Kunkle. That application entitled "Manufacture of Glass" is commonly assigned, and its disclosure is incorporated by reference herein.

BACKGROUND OF THE INVENTION

1. Field of the Invention

This invention relates to the manufacture of a continuous sheet of flat glass by floating molten glass on a pool of molten metal while attenuating and cooling the glass. More particularly, this invention relates to a method and apparatus for manufacturing glass sheets of improved optical quality and diminished surface defects when compared with the conventional manufacture of glass by a float process.

2. Description of the Prior Art

It has been proposed heretofore to form a continuous sheet of glass by depositing molten glass onto a bath of molten metal having a density greater than the density of the glass and drawing the glass along the molten metal while cooling it and attenuating it to form a continuous, dimensionally stable ribbon or sheet of glass, which may then be withdrawn from the bath for further processing. Early developments, such as those of Heal, U.S. Pat. No. 710,357, and of Hitchcock, U.S. Pat. No. 789,911, show making flat glass by continuously feeding molten glass onto a pool of molten metal to form a ribbon of glass which is cooled and drawn along the molten metal to form a finished ribbon of glass. Other glass manufacturing processes which have been commonly practiced are embraced within the teachings of U.S. Pats. Nos. 3,083,551 and 3,220,816. These patents teach pouring molten glass onto molten metal in a manner such that the glass is allowed to freely fall onto the molten metal. The molten glass then separates into a rearwardly flowing stream and a forwardly flowing stream and flows outwardly before being drawn or advanced along the molten metal to form a continuous sheet of glass.

One particularly bothersome problem which has been encountered in the manufacture of flat gass by various float processes has been the difficulty in establishing uniform transverse temperature distributions in a molten glass layer once it is established on the molten metal. There is a pronounced tendency for the marginal portions of the glass to be substantially colder than the central portion of the glass and for the temperature across the glass to increase from the margins to the center in a pronounced parabolic shape. Because of the visco-elastic nature of glass and because of the longitudinal attenuation forces applied to the glass during forming, the establishment of this parabolic temperature profile has been blamed for optical distortion in the glass, believed to be caused by unbalanced shear forces within the body of glass. Previous attempts to control the lateral temperature distribution in the glass have been confined to techniques which impose heat transfer only at discrete locations along the path of glass flow, and so have been ineffective to counteract this problem. Representative of the techniques for temperature control are the use of coolers and radiant heaters disposed remotely from the glass and the use of electromagnetic induction motors to establish convention within the molten metal, such as disclosed in U.S. Pat. No. 3,479,171.

Another difficulty encountered with commercial float processes has been the necessity of employing long forming chambers of the order of 200 feet (61 meters) long to produce flat glass at a rate of 300 to 800 tons per day ($2.7 \times 10^5$ to $7.3 \times 10^5$ kilograms per day). This length is necessary to cool the glass sufficiently to prevent it from sagging or being marked during removal from the forming chamber while cooling it sufficiently slowly to flatten it and control its thickness.

The present invention is directed to a method and apparatus for manufacturing flat glass which are effective to overcome the problems of the present manufacturing techniques described above.

SUMMARY OF THE INVENTION

The present invention includes the steps of delivering molten glass onto a pool of molten metal in a forming chamber and then advancing the delivered glass along the surface of the molten metal while cooling it to form a sheet or ribbon of glass. As the glass is advanced along the surface of the pool of molten metal, heat is transferred from the glass to the metal. A portion of the molten metal is removed from the pool of molten metal and colder metal is directed into the pool of molten metal. The removed molten metal is preferably cooled and recirculated to the pool of molten metal as the colder metal. By removing hotter molten metal from the pool and directing colder metal to the pool, it is possible to rapidly cool the glass advancing over the pool of molten metal and have the glass at a suitably low temperature for removal from the pool of molten metal from an unusually short residence time on the pool of molten metal. Although the cooling rate is quite rapid it is possible to establish a relatively uniform rate of cooling over the length of the pool of molten metal by removing hotter molten metal from the upstream portion of the pool in the vicinity of molten glass delivery and directing colder metal into the downstream end of the pool in the vicinity of glass sheet removal.

A particularly beneficial aspect of this invention is that considerably more heat may be extracted from glass advancing over molten metal when the metal is cooled in a cooling circuit external to the pool. By cooling the metal externally and circulating the molten metal in the pool counter to glass advance, a relatively high and uniform temperature differential between the glass and adjacent metal is maintained over the length of a forming chamber. This provides a high and uniform driving thermal gradient for inducing rapid uniform heat transfer from the glass to the metal. Also, counter flow and advance reduces the glass-metal interfacial heat transfer resistance further enhancing heat transfer.

In a short forming chamber it is necessary to provide substantial cooling capacity in a physically small space. Any attempt to add coolers immersed in the molten metal or extending into the chamber along its sides clutters the space making access to and usage of devices, such as glass edge rolls, difficult. Also, because coolers are generally somewhat buoyant in tin, it is difficult to provide substantial cooling beneath the central portion of advancing glass in a forming chamber. Coolers immersed in the metal tend to rise in the central region where, because of the glass, they can't be held down from above. This requires more massive edge holddown members which inherently extract more heat from the molten metal near the sides of the forming chamber. All these problems are avoided in the practice of this invention as sufficient cooling may be provided in selected parts of a forming chamber. This permits maintenance of highly desirable uniform heat transfer and glass flow patterns as glass is being formed into a continuous sheet. Thus, this invention supplements and augments the desirable features of horizontal molten glass delivery followed by uniform transverse temperature control envisioned by the invention of Edge and Kunkle disclosed in U.S. Pat. No. 3,843,346.

In the preferred embodiment of this invention molten metal is caused to flow countercurrently to the advance of the molten glass and of the sheet or ribbon formed therefrom on the molten metal. This flowing molten metal travels to a drain adjacent the upstream end of the forming chamber where molten glass is being delivered onto the molten metal. It is removed through the drain for recycling to the pool of molten metal. Due to this metal flow, uniform transverse temperatures are established within the glass as it is formed into a continuous sheet. The molten metal has a transverse velocity profile which is substantially parabolic in nature with the velocity greatest along its centerline so that the heat transfer between the molten glass and molten metal is preferentially enhanced along the centerline of the glass ribbon as it is being formed.

In a particularly preferred embodiment, the molten metal flowing countercurrent to the glass movement travels to the entrance of a transverse bottom drain extending across the upstream end of the forming chamber at a threshold between the glass furnace and the forming chamber. The molten metal flows through the transverse drain and may be delivered to a heated chamber. Within that chamber, any glass which may have accompanied the drained molten metal floats on the molten metal and may be easily separated for discard or recycle into a melting zone of the glass furnace. The molten metal in the chamber is recycled to the forming chamber either by a pump suitable for pumping molten metal or by employing a plurality of such chambers and permitting a chamber to cool occasionally to solidify the metal such that it may be removed from the chamber and carried back to the forming chamber.

It is also possible in the practice of this invention to cause molten metal to continuously flow over a weir at the downstream end of the chamber so that the continuous sheet of glass may be withdrawn without lifting it. In such an arrangement the overflowing metal is returned to the pool of molten metal in a manner similar to that employed for returning molten metal from the upstream end of the chamber.

By practicing this invention it is possible to successfully operate forming chambers having lengths less than one-fourth to one-tenth the lengths of forming chambers commonly employed for similar glass production rates (mass throughputs). For example, it is possible to provide forming chambers having lengths on the order of 10 to 15 feet (3 to 4 meters) which can be constructed in place of existing drawing kilns when rebuilding existing sheet glassmaking furnaces. Thus, it is possible to rehabilitate existing, old window or sheet glass facilities, such as those for making glass by the Pittsburgh process, the Fourcault process or the Colburn process, and to use existing batching facilities, furnaces (except kilns), conveyors, cutting devices and warehousing facilities to produce high-quality glass suitable for today's markets.

The present invention will be further understood from the drawings and descriptions which follow.

DESCRIPTION OF THE PREFERRED EMBODIMENTS

Figure 1:
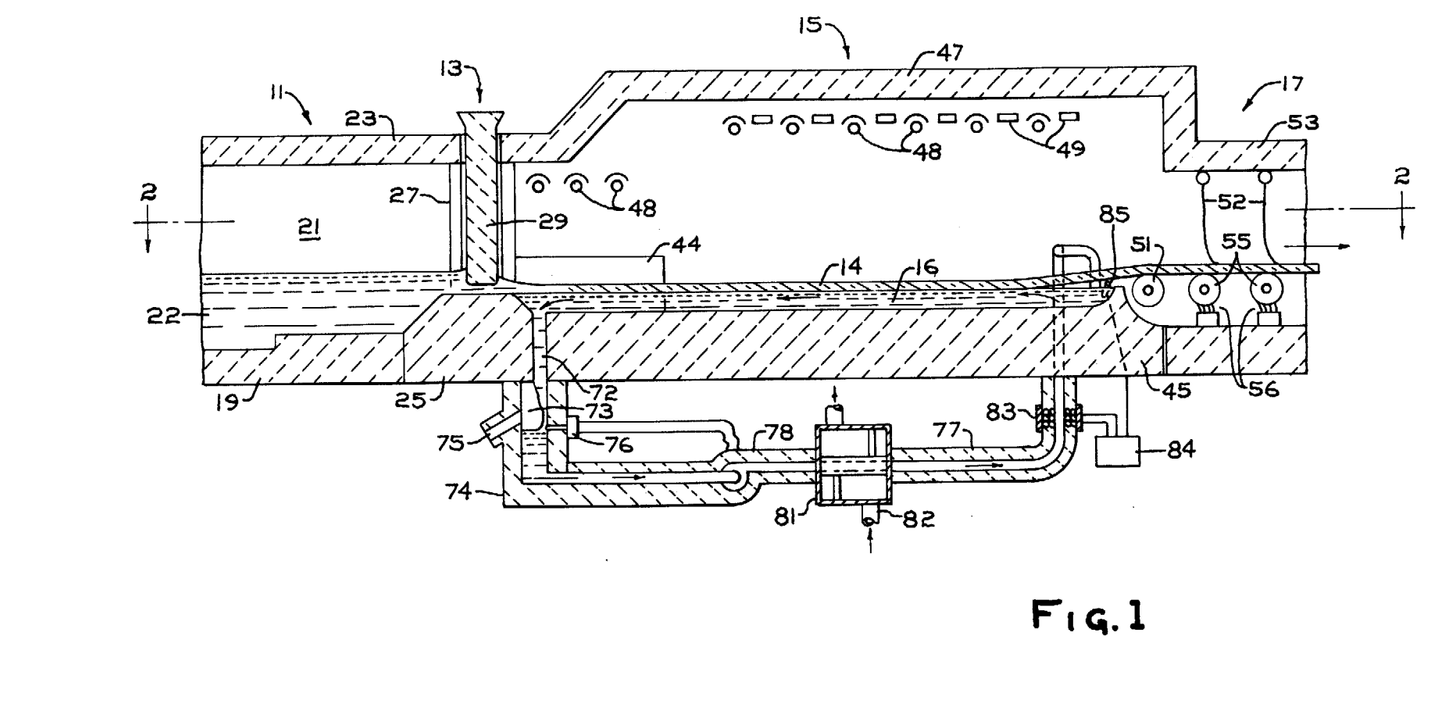
FIG. 1 is a partial schematic longitudinal sectional elevation of an apparatus for making glass according to the particular embodiment of the present invention which provides for the countercurrent flow of molten metal.
Figure 2:
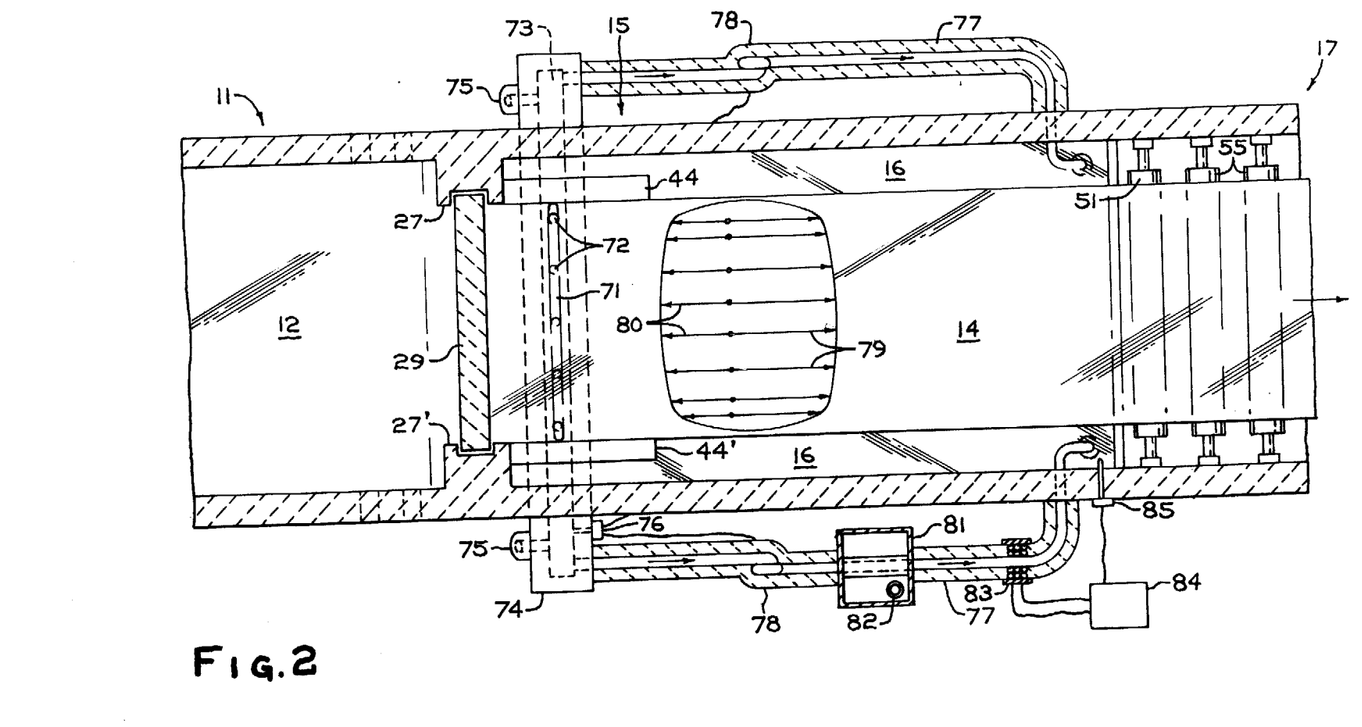
FIG. 2 is a partial schematic sectional plan view taken along section line 2—2 of FIG. 1 showing the countercurrent velocity profiles established within the glass and molten metal when practicing one embodiment of this invention.

In FIGS. 1 and 2 there is shown an apparatus for producing glass according to the method of this invention. A glass furnace terminating in a refining and conditioning zone 11 contains molten glass 12. This molten glass conditioner 11 is connected to a molten glass discharge and delivery facility 13 through which molten glass 12 flows in a controlled manner to be formed into a sheet or ribbon of glass 14 in a forming chamber 15. The forming chamber 15 has within it a pool of molten metal 16 having a density greater than the density of the glass 12. The metal is preferably tin or an alloy of tin. The upper surface of the molten metal is preferably adjusted to a level such that glass 12 may flow without falling freely onto the molten metal 16. However, this invention may be practiced in conjunction with a free fall delivery facility. During the movement or advance of the glass downstream through the forming chamber 15 the glass is cooled to cause it to change from molten glass 12 to a dimensionally stable, continuous sheet or ribbon of glass 14 having its thickness defined by the extent to which the molten glass is attenuated while being cooled. The glass sheet or ribbon is advanced along the surface of the molten metal 16 through the forming chamber 15 to means 17 for removing it from the forming chamber. The glass sheet removing facility 17 may provide means for lifting the glass and conveying it upwardly, vertically or slightly upwardly, then horizontally as shown.

The molten glass conditioner 11 comprises a refractory floor 19, sidewalls 21 and a roof 23. In the preferred embodiments of this invention the bottom floor 19 of the conditioner or refiner is stepped so that the depth of molten glass in the conditioner is less near its discharge end than at locations farther upstream within the conditioner. The molten glass conditioner is constructed and operated so that glass passing through it toward the glass discharge and delivery facility is gradually cooled and allowed to lose gaseous and volatile impurities. The molten glass 12 is cooled to a temperature at which it is still flowable but such that with some further cooling it may be formed into a dimensionally stable sheet of glass. For typical soda-lime-silica glasses the temperature of the molten glass in the glass conditioner closest to the delivery means is from about 1700° to 2200°F.

The preferred glass discharge and delivery facility 13 comprises a support for the molten glass. In the preferred embodiment the support is a threshold block 25. The glass discharge and delivery facility also comprises side jambs 27 and 27' which define the sides of the channel through which molten glass may flow. The glass discharge and delivery means also comprises an adjustable metering means 29 extending downwardly into the molten glass. This metering means 29 is essentially a movable gate or tweel which may be adjusted upwardly or downwardly to control the size of the elongated horizontal opening formed by the threshold block 25, side jambs 27 and 27' and the tweel itself, 29. Just downstream of the bottom supporting member or threshold block of the discharge facility in this invention is a drain for draining molten metal from the pool of molten metal. This feature, which, in part, characterizes this invention, is discussed in greater detail below.

Moving downstream through the process, glass is delivered through the opening of the delivery facility and onto the surface of the pool of molten metal 16, preferably tin. This delivery may be substantially horizontal as shown in FIG. 1 or the threshold block may be downwardly sloped so that the glass flows downwardly onto the molten metal or the glass may fall from a lip or other support onto the molten metal.

The transverse lateral dimension of the stream of molten glass flowing onto the molten metal, which is first defined by the space between side jambs 27 and 27', may be maintained by providing a sufficient velocity of advance or by the spacing between guides or restraining members 44 and 44' or the glass may be permitted to spread to a greater width. The restraining members 44 and 44' are substantially parallel guides comprising material which is preferably wet only to a limited extent by the molten glass. The guides or restraining members 44 and 44' may be provided with means for temperature control (not shown), such as means for heating and cooling them. In a preferred embodiment a longitudinal temperature gradient is established along the restraining member length so that there is relatively more wetting of each restraining member near the glass discharge means than there is wetting of the restraining member by glass at its downstream extremity.

The structure of forming chamber 15 comprises a bottom 45, sidewalls 46 and a roof 47. Mounted along the roof 47 are a series of heaters 48 and a series of coolers 49 which face the top surface of the floating glass 14. These provide for the controlled heating or cooling of the glass 14 so that the glass may be attenuated and cooled to a dimensionally stable sheet or ribbon of desired width and thickness for removal from the forming chamber 15. During operation, the upper portion of the forming chamber is filled with a protective non-oxidizing atmosphere, such as a mixture of nitrogen and hydrogen. This protects the molten metal from oxidizing.

At the downstream end of the forming chamber 15 is a glass removal or takeout means 17. At the end of the forming chamber is a takeout roll 51 disposed transversely across the path of glass movement. This roll supports the ribbon of glass 14 to lift it up from the molten metal bath 16. A series of barriers 52 engage the upper surface of the ribbon of glass 14 to isolate the atmosphere in the forming chamber 15 above the surface of the glass from the external environment and from a lehr or other downstream processing equipment. The barriers 52 preferably comprise flexible asbestos sheeting mounted on and depending from a roof member 53 extending from the roof 47 of the bath chamber 15.

The takeout means 17 comprises, in addition to the takeout roll 51 and barriers 52, a series of rolls 55 which support the glass and apply a longitudinal tractive force to the glass, drawing it from the forming chamber 15 and carrying it to further processing apparatus, such as an annealing lehr. Mounted in contact with the rollers 55 are a series of brushes 56 which also serve to isolate the forming chamber 15 from later processing apparatus.

In practicing the method of this invention sufficient tractive force is applied to the glass from rollers 55, as well as from downstream rollers (not shown) to unidirectionally attenuate the glass to its desired final thickness, particularly when its desired final thickness is less than equilibrium thickness.

In the preferred embodiment of the present invention shown in FIGS. 1 and 2 a flow of molten metal is established countercurrent to the movement of glass. This countercurrently flowing metal withdraws heat from the glass. By employing appropriate flow rates, more heat may be removed from the central portion of glass than from the marginal portions of the glass. This provides for a more uniform lateral distribution of temperature within the glass during its formation than is possible in conventional float glass manufacture. Therefore, the resulting product exhibits less optical distortion than does glass made by a conventional float forming process.

In the embodiment of this invention shown in FIGS. 1 and 2, a transverse drain 71 is disposed across the bottom 45 of the forming chamber 15 immediately downstream of the threshold block 25. Connected to the transverse drain 71 are several drain holes 72 which extend downwardly into a transverse collecting cavity 73. Molten metal is permitted to flow into the collecting cavity 73 during the manufacture of glass. The collecting cavity is defined by walls 74 through which drains 75 are constructed. The drains 75 are located above the bottom of the collecting cavity so that any molten glass or scum entering the cavity and floating on top of molten metal in the collecting cavity may be removed from time to time.

The collecting cavity 73 is preferably provided with a level detector-controller 76 which is used to maintain a sufficient level of molten metal in the cavity 73 to permit pumping therefrom. Insulated and heated conduits 77 are connected to the collecting cavity 73. These conduits 77 lead to the downstream end of the forming chamber 15 and provide a means for recirculating molten metal to the pool of molten metal 16 in the chamber 15. Each conduit 77 is provided with pumping means 78 to force molten metal from the collecting cavity 73 back to the molten metal pool 16. These pumping means, which preferably are electromagnetic pumps, are connected to the level detector-controller 76, which controls their operation providing for the uniform flow of molten metal through the process. The conduits 77 are directed through cooling facilities 81 connected to coolant conduits 82 in the event that sufficient cooling of the molten metal is not provided simply by heat transfer to the ambient surroundings through the walls of the conduits 77.

The flows which are established in the glass and molten metal are illustrated schematically in FIG. 2. The glass, of course, flows in the general direction of glass advance. In the practice of this invention a relatively flat, transverse velocity profile is obtained as may be noted from the individual glass flow velocity vectors 79 shown. The molten metal velocity vectors 80 are opposite in direction and generally less in magnitude than the glass flow velocity vectors. The relative magnitudes of velocity vectors may be noted from FIG. 2 with the dots at the common tails of the velocity vectors indicating zero velocity. The relatively flat transverse velocity profile in the glass is in part due to glass-metal drag and in part due to relatively greater cooling in the central portion of the glass flow due to greater counter-current molten metal flow there. This improved flatness of velocity across the glass enhances the optical quality of glass produced by confining critical internal stresses in the glass to its edges during formation.

It is desirable for precise control of metal temperature during introduction of metal into the pool of molten metal to provide a heater 83 for the metal to be introduced and to connect this heater to a controller 84 which in turn is connected to a temperature detector 85 such as a thermocouple immersed in the molten metal near the location of metal introduction. During operation, the temperature of the metal is detected and by conventional operation of the controller 84 the heater is controllably operated to heat the metal to be introduced. The heat 83 is conveniently an electric strip heater connected through control actuators of the controller 84 to a source of power (not shown). For example, one can use such a control system to control the temperature of molten tin being directed into the forming chamber within a preselected range such as between the melting point of tin or 20°F. (10°C.) above it to 180°F. (100°C.) above the melting point of tin.

FIG. 2 has illustrated alternate metal circulation systems on opposite sides of the forming chamber. In practice it is, of course, desirable to have similar (and therefore symmetric from a process view) systems on each side of a chamber or a single system serving the forming chamber. The system shown at the top of FIG. 2, which is the left side of the forming chamber viewing along the direction of glass advance, provides thermal regulation of the circulating metal only by the rate of heat loss from the metal to the ambient environment through a thermally insulated conduit. On the other hand, the system shown at the bottom of FIG. 2, which is the right side of the forming chamber, provides for more sophisticated thermal regulation of circulating metal as already described.

Figure 3:
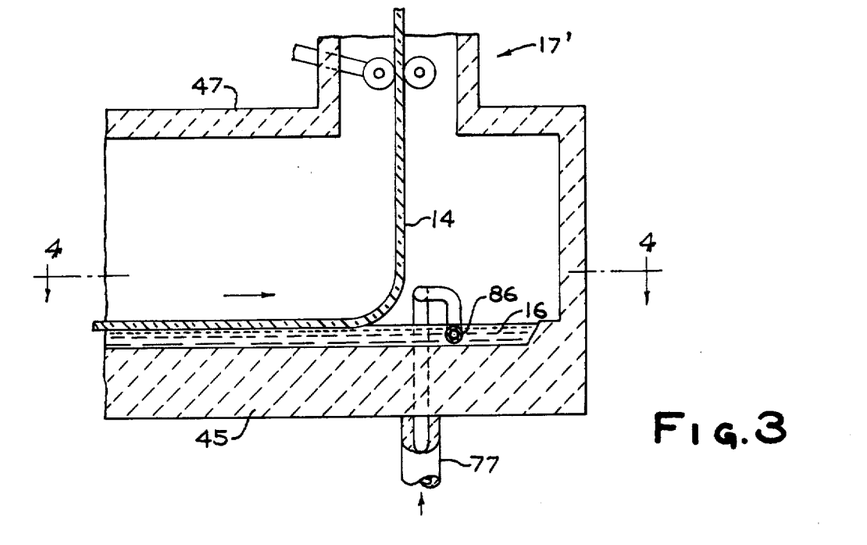
FIG. 3 is a partial schematic longitudinal sectional elevation of the downstream end of a forming chamber providing for vertical removal of a formed sheet of glass.
Figure 4:
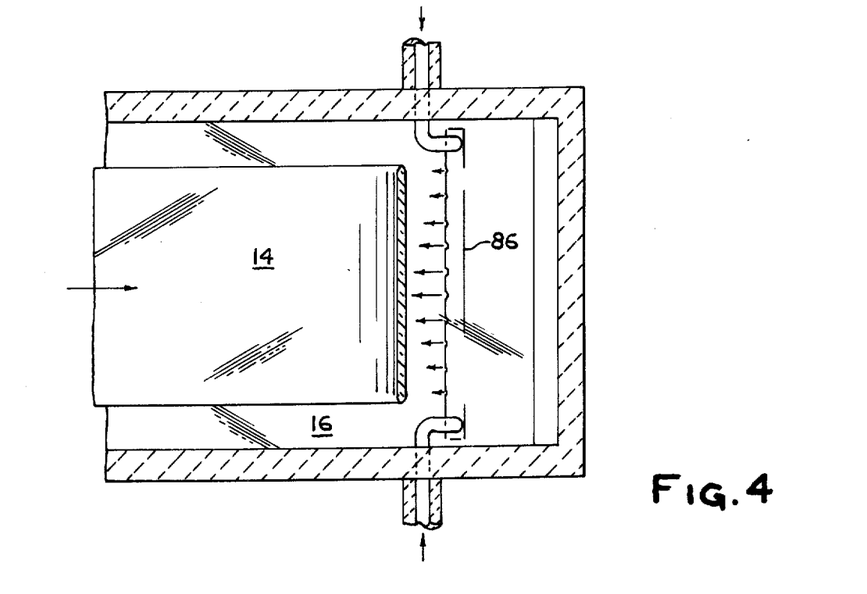
FIG. 4 is a partial schematic sectional plan view taken along section line 4—4 of FIG. 3.

Referring now to FIGS. 3 and 4, there is shown another preferred embodiment of this invention. A forming chamber is provided with a glass sheet removal facility 17' comprising a substantially vertical conveyor extending upwardly from the downstream portion of the forming chamber. By constructing a short forming chamber in the space of a sheet drawing kiln connected to a sheet or window glassmaking furnace it is possible to use an existing drawing machine comprising a plurality of traction rolls, necessary gears and drive equipment as the glass sheet conveyor.

In this embodiment of the invention it is particularly easy to direct cooled molten metal into the pool 16 of molten metal across the width of the pool. In a preferred embodiment a sparger 86 extends across at least the central portion of the chamber near its downstream end. This sparger 86 is connected to the metal conduits 77 and has openings for directing molten metal into the pool. As illustrated by the arrows showing molten metal flow from the sparger 86 into the pool, it is preferred to direct more molten metal into selected portions of the pool, particularly the central portion and the quarter points about halfway between the center and the sides of an advancing sheet of glass. This serves to make uniform the temperatures of the advancing glass across its full width. The selectively different molten metal flows are conveniently established by providing the sparger 86 with openings of varying size along its length. The sparger may be constructed of graphite, molybdenum, molybdenum-tungsten alloy or the like.

A sparger such as illustrated may be used with any desired combination of forming chamber and glass removal facility. However, it is most conveniently used in combination with a vertical (or upward) glass removal facility because of its accessability in such a combination. When used in combination with a vertical glass removal facility a sparger is positioned just downstream of the line of glass liftoff and located at a depth and orientation suitable for directing the molten metal from the sparger substantially counter to the horizontal advance of the glass, along a substantially horizontal path and just beneath the upper surface of the pool of molten metal.

Figure 5:
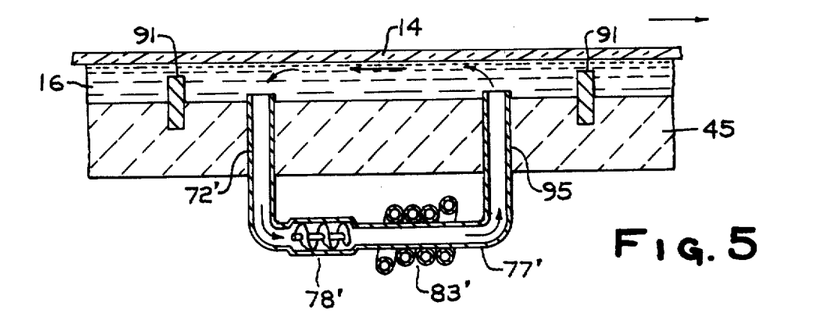
FIGS. 5 and 6 show respectively a partial sectional elevation and a partial plan of a portion of a glass forming chamber in which barriers are provided to compartmentalize the pool of molten metal and metal is removed from, cooled and recirculated to a compartment.
Figure 6:
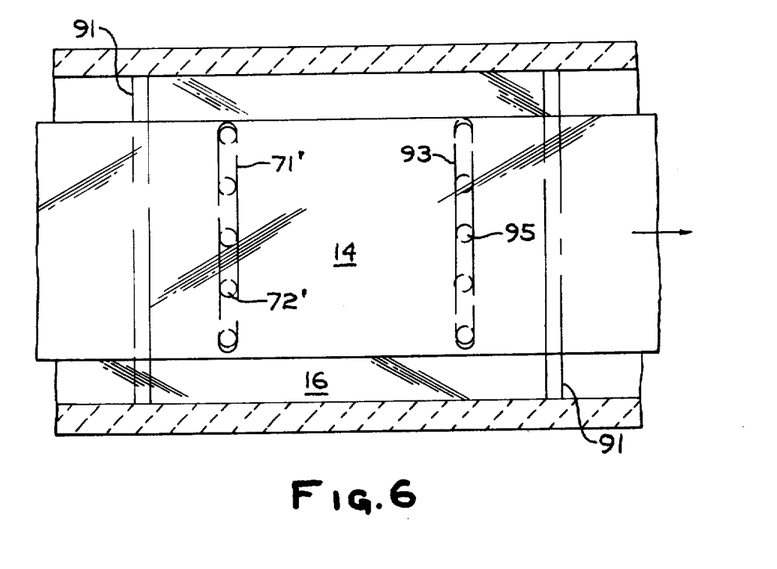

Referring now to FIGS. 5 and 6, there is shown an embodiment of the invention wherein molten metal is removed from a compartment in a pool of molten metal while temperature regulated metal is directed to the compartment. As glass 14 advances (as shown by the arrows associated with it) along the surface of a pool of molten metal 16 it passes over barriers or dams 91. These separate the pool of metal into compartments, each of which may be subject to thermal control. The principles of this invention are used to provide thermal control within a compartment. Molten metal (tin) is withdrawn from the compartment through drain slot 71' and drains 72'. It passes to a pump 78' and through conduit 77' through a cooling coil 83'. The cooled metal is then directed through distribution channel 93 having holes 95 into the pool of molten metal in the compartment.

Figure 7:
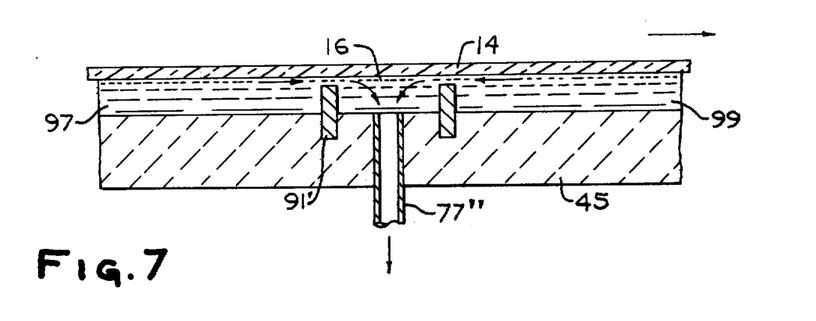
FIG. 7 shows a partial sectional elevation of a portion of a glass forming chamber providing for the removal of molten metal from between closely adjacent barriers.

Referring now to FIG. 7, there is shown an embodiment of the invention in which molten metal is removed from the pool from a drain 77'' or the like disposed between two closely spaced barriers 91'. In this way the metal of each of the adjacent compartments 97 and 99 is virtually isolated from the metal of the other. Such isolation is desirable for individual control of heat transfer at discrete locations along the path of glass advance.

The principles of the present invention will be understood by those skilled in the art to be applicable to situations not specifically described herein. Accordingly, this disclosure is not intended to be limiting, but rather to be illustrative of the invention.

We claim:

1. In a method of manufacturing a continuous sheet of glass comprising the steps of delivering molten glass onto a pool of molten metal, advancing the glass along the surface of the pool of molten metal, cooling the glass sufficiently to form a continuous sheet of glass and removing the continuous sheet of glass from the pool of molten metal, the improvement comprising
    establishing a flow of molten metal in the pool of molten metal beneath the advancing glass, which flow is substantially counter to the direction of glass advance;
    removing molten metal from the pool of molten metal in the vicinity where molten glass is delivered onto the pool of molten metal;
    cooling the removed molten metal; and
    directing the cooled metal into the pool of molten metal in the vicinity where the continuous sheet of glass is removed from the pool of molten metal.

2. In a method of manufacturing flat glass wherein a layer of glass is advanced in a path from an upstream location to a downstream location along the surface of a pool of molten metal while the glass is cooled to form a continuous sheet of glass, the improvement comprising
    removing a portion of the molten metal from the pool of molten metal at the upstream location,
    regulating the temperature of the removed portion of molten metal, and
    directing the temperature-regulated metal into the pool of molten metal at the downstream location.

3. The method according to claim 2 wherein the removed molten metal is cooled to regulate its temperature.

4. The method according to claim 3 wherein the removed molten metal that has been cooled is controllably heated to adjust and maintain the temperature of the molten metal being directed to the pool of molten metal at a temperature within a preselected range.

5. The method according to claim 3 wherein the removed molten metal is cooled sufficiently to solidify it.

6. The method according to claim 2 wherein the temperature-regulated metal is directed into the pool of molten metal over a region extending substantially across at least a central portion of the width of the pool of molten metal.

7. The method according to claim 6 wherein the continuous sheet of glass is lifted upwardly from the pool of molten metal to remove it therefrom and wherein the temperature-regulated metal is directed into the pool of molten metal in the vicinity of lifting the sheet of glass from the pool of molten metal.

8. The method according to claim 6 wherein temperature-regulated metal is directed at a greater rate at selected locations than at other locations across the width of the pool of molten metal.

9. The method according to claim 8 wherein temperature-regulated metal is directed at a greater rate into the central portion of the pool of molten metal than into the side portions of the pool of molten metal.

10. The method according to claim 2 wherein solid metal is directed to the pool of molten metal.

11. In an apparatus for making flat glass comprising a forming chamber containing a pool of molten metal and having an upstream, inlet end and a downstream, outlet end; means for delivering molten glass onto the pool of molten metal in the forming chamber in its upstream end, means for advancing the glass in a path along the surface of the pool of molten metal toward the downstream end of the forming chamber; means for cooling the glass during its advance for forming a continuous sheet of glass therefrom; and means for removing the formed sheet of glass from the pool of molten metal and from the forming chamber; the improvement comprising
    means for removing a portion of the molten metal from the upstream end of the pool of molten metal,
    means for regulating the temperature of the removed molten metal, and
    means for directing temperature-regulated metal into the downstream end of the pool of molten metal.

12. The apparatus according to claim 11 wherein the means for removing molten metal from the pool of molten metal comprises a drain connected to bottom of the forming chamber.

13. The apparatus according to claim 12 wherein the drain extends substantially across at least the central portion of the forming chamber.

14. The apparatus according to claim 13 wherein the molten glass delivery means includes a glass supporting threshold extending across the upstream end of the forming chamber for delivering molten glass along a substantially horizontal path onto the pool of molten metal and wherein the drain extends across the forming chamber substantially immediately adjacent the threshold.

15. The apparatus according to claim 11 wherein the means for regulating the temperaure of the removed portion of molten metal comprises a cooler.

16. The apparatus according to claim 15 further comprises means for adjusting and maintaining the temperature of the metal directed into the pool of molten metal within a preselected range.

17. The apparatus according to claim 16 wherein the metal temperature adjusting and maintaining means comprises means for detecting the temperature of the metal directed to the pool of molten metal, and means for heating the metal prior to being directed to the pool of molten metal, the heating means being responsive to the temperature detecting means.

18. The apparatus according to claim 11 wherein the means for directing temperature-regulated metal to the pool of molten metal comprises pumping means connected to the forming chamber by conduit for carrying molten metal and molten metal distribution means connected to the conduit for distributing molten metal into the pool of molten metal.

19. The apparatus according to claim 18 wherein the molten metal distribution means comprises a sparger disposed within the pool of molten metal and connected to the metal-carrying conduit.

20. The apparatus according to claim 11 wherein the means for removing a sheet of glass from the forming chamber comprises means for lifting the glass upwardly from the pool of molten metal and for conveying it upwardly therefrom and wherein the means for removing molten metal from the pool of molten metal comprises a drain in the bottom of the forming chamber in its upstream end, which drain is operatively connected to a conduit for carrying molten metal which is provided with a molten metal pump and operatively connected to the temperature-regulating means and wherein the conduit is connected to means for directing the metal into the downstream end of the forming chamber in the vicinity where glass is lifted upwardly from the pool of molten metal.

* * * * *